R. M. TUDOR.
Ornamented Window-Glasses.
No. 8,514. Reissued Dec. 3, 1878.
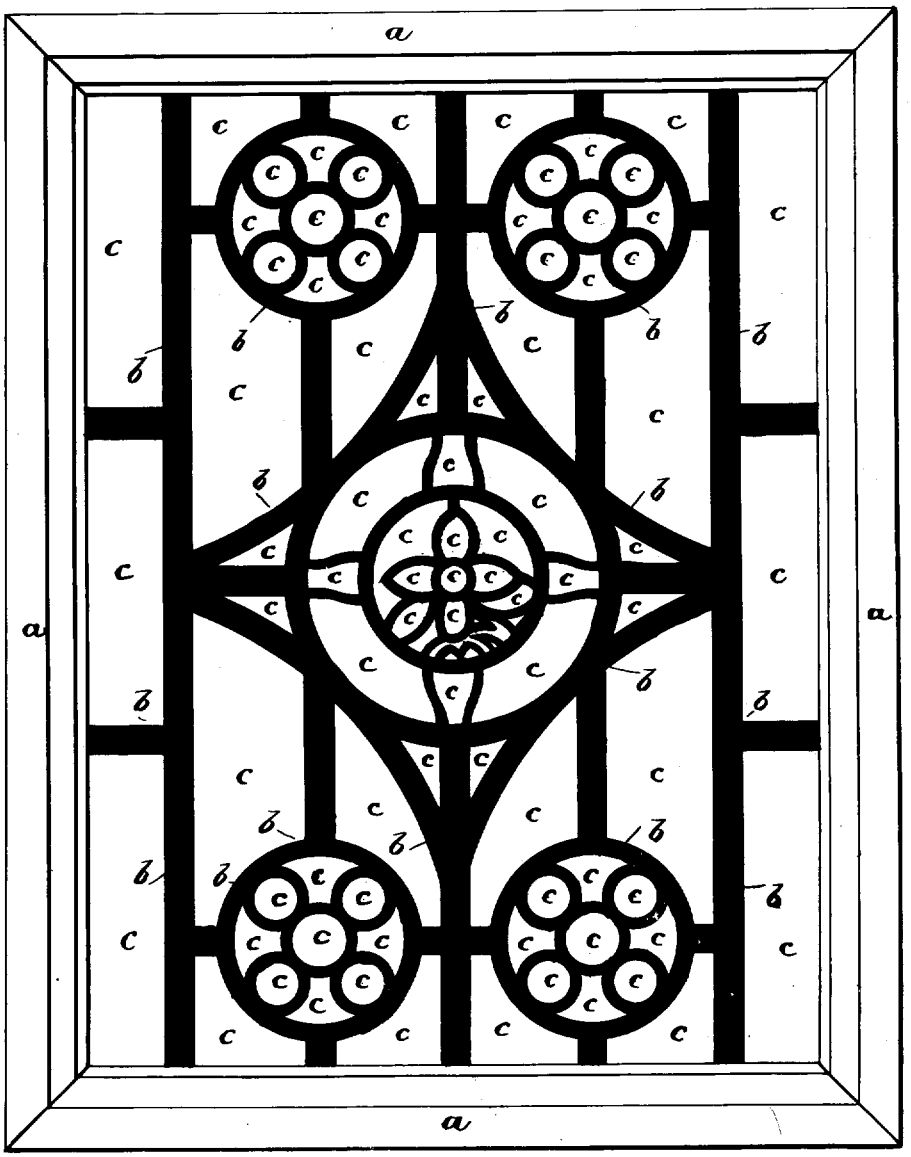
Witnesses:
P. Dietrich.
C. H. Watson
Inventor:
Robert M. Tudor.
Per Munn & Co. Attorneys.

UNITED STATES PATENT OFFICE.

ROBERT M. TUDOR, OF PHILADELPHIA, PENNSYLVANIA.

IMPROVEMENT IN ORNAMENTED WINDOW-GLASS.

Specification forming part of Letters Patent No. 191,270, dated May 29, 1877; Reissue No. 8,514, dated December 3, 1878; application filed November 20, 1878.

*To all whom it may concern:*

Be it known that I, ROBERT M. TUDOR, of the city of Philadelphia, State of Pennsylvania, have invented a new and useful Article of Manufacture for Ornamenting Window-Glass, of which the following is a specification:

The object of my invention is the production of ornamental designs cheaply upon paper, imitating stained glass set in metallic sashes, easily applicable to ordinary glass window-panes.

The nature of my invention consists in paper having opaque lines printed, painted, or stained thereon, resembling the outlines of leaden sash-bars usually employed in the construction of stained-glass windows, and transparent coloring applied by printing, staining, or painting to the spaces between the opaque lines. This paper is easily transported and readily applied to window-panes; and when oiled or coated and filled in the pores with resinous substances, as by varnishing, it becomes in the colored portions more or less transparent, and presents the pleasing effect of stained glass of usual construction.

Plain paper, such as lithographic or writing paper, may be used. Paper more transparent is preferable. The opaque lines and coloring may be applied on one or both sides of the paper. The paper so prepared may be applied to the glass in various ways—by gumming at the corners only, by pins or button-fastenings, or by gumming at the margins. Applied in any of these ways it is readily removed.

When to be used permanently, it is cemented to the glass by any transparent adhesive material, such as paste, starch, varnish, albumen, or gum, and when afterward varnished (preferably with copal varnish) it becomes waterproof and of increased transparency.

The paper after being applied to a window may be further protected by covering it with glass.

The low cost and extreme lightness and portability of the prepared paper permits of its application in situations where the high first cost and difficulties and expenses of transportation and risk of accident prevent the use of stained glass.

The annexed drawing represents a front view of a pane of glass with the ornamented paper prepared as described applied thereto, mounted in a sash or frame.

*a* represents the frame or sash; *b*, the opaque or leaden sash-lines, and *c* the transparent colored spaces or figures.

The invention is vended in the form of the prepared paper, and usually applied to window panes or lights after they have been set in the sash.

Printing has thus far been the preferable mode of preparing the paper.

Having described my invention and the mode of making and using the same, I claim as new and useful and as my original invention—

1. As a new manufacture, paper having opaque lines imitating the lead sash-bars of stained-glass windows and stained or colored transparent or translucent spaces or figures adapted to ornamenting windows, substantially as and for the purpose set forth.

2. As a new manufacture, an ornamented glass window-pane consisting of ordinary glass, in combination with a paper containing opaque lines and transparent or translucent colored spaces imitating leaden sash and colored glass in stained windows, substantially as set forth.

R. M. TUDOR.

Witnesses:
J. DANIEL EBY,
S. LLOYD WIEGAND.